United States Patent
Qian et al.

(10) Patent No.: US 10,812,292 B2
(45) Date of Patent: Oct. 20, 2020

(54) PACKET PROCESSING METHOD AND DEVICE

(71) Applicant: Huawei Technologies Co., Ltd., Shenzhen (CN)

(72) Inventors: Guofeng Qian, Beijing (CN); Guanfeng Li, Beijing (CN); Li Xue, Shenzhen (CN); Haibo Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/371,934

(22) Filed: Apr. 1, 2019

(65) Prior Publication Data

US 2019/0229950 A1    Jul. 25, 2019

Related U.S. Application Data

(63) Continuation of application No. 14/992,246, filed on Jan. 11, 2016, now Pat. No. 10,250,410, which is a
(Continued)

(51) Int. Cl.
*H04L 29/06*    (2006.01)
*H04L 12/46*    (2006.01)
(Continued)

(52) U.S. Cl.
CPC .......... *H04L 12/4633* (2013.01); *H04L 12/66* (2013.01); *H04L 45/24* (2013.01);
(Continued)

(58) Field of Classification Search
None
See application file for complete search history.

(56) References Cited

U.S. PATENT DOCUMENTS 7,583,677 B1    9/2009  Ma et al.
2004/0190536 A1    9/2004  Wang
(Continued)

FOREIGN PATENT DOCUMENTS

CN    101185296 A    5/2008
CN    101635665 A    1/2010
(Continued)

OTHER PUBLICATIONS

Foreign Communication From a Counterpart Application, Chinese Application No. 201710370043.2, Chinese Office Action dated Sep. 3, 2019, 9 pages.
(Continued)

*Primary Examiner* — Kodzovi Acolatse
(74) *Attorney, Agent, or Firm* — Conley Rose, P.C.

(57) ABSTRACT

A packet processing method includes receiving, by an aggregation gateway, a first tunnel establishment request message sent by a home gateway, and sending a first tunnel establishment success message to the home gateway; receiving, by the aggregation gateway, a second tunnel establishment request message sent by the home gateway, and sending a second tunnel establishment success message to the home gateway; associating, by the aggregation gateway, a first tunnel with a second tunnel according to an identifier of the home gateway; and sending a downlink packet to the home gateway by using the first tunnel and/or the second tunnel. The embodiments of the present application may increase bandwidth.

25 Claims, 5 Drawing Sheets

Related U.S. Application Data continuation of application No. PCT/CN2013/079328, filed on Jul. 12, 2013.

(51) Int. Cl.
  *H04L 12/707* (2013.01)
  *H04L 12/803* (2013.01)
  *H04L 12/66* (2006.01)
  *H04L 29/12* (2006.01)

(52) U.S. Cl.
  CPC ........ *H04L 47/125* (2013.01); *H04L 61/2007* (2013.01); *H04L 65/1036* (2013.01); *H04L 65/1069* (2013.01)

(56) References Cited

U.S. PATENT DOCUMENTS

| | | |
|---|---|---|
| 2006/0274716 A1 | 12/2006 | Oswal et al. |
| 2009/0054037 A1* | 2/2009 | Kaippallimalil ........ H04L 63/08 455/411 |
| 2009/0122990 A1* | 5/2009 | Gundavelli ......... H04L 12/4641 380/278 |
| 2009/0313690 A1 | 12/2009 | Bichot et al. |
| 2010/0008245 A1 | 1/2010 | Viger et al. |
| 2010/0014532 A1 | 1/2010 | Wakayama et al. |
| 2011/0026537 A1 | 2/2011 | Kolhi et al. |
| 2012/0044862 A1 | 2/2012 | Chen et al. |
| 2012/0110655 A1 | 5/2012 | Lee et al. |
| 2012/0307824 A1 | 12/2012 | Sun |
| 2013/0086665 A1* | 4/2013 | Filippi ................ H04L 63/0272 726/7 |
| 2013/0215864 A1* | 8/2013 | Kolbe ................ H04L 12/4633 370/329 |
| 2015/0033021 A1 | 1/2015 | Peerapol et al. |
| 2015/0295728 A1* | 10/2015 | Kadel ................ H04L 12/2863 370/235 |

FOREIGN PATENT DOCUMENTS

| | | |
|---|---|---|
| CN | 101909074 A | 12/2010 |
| CN | 102217243 A | 10/2011 |
| CN | 102695236 A | 9/2012 |
| CN | 102916907 A | 2/2013 |

OTHER PUBLICATIONS

Foreign Communication From a Counterpart Application, European Application No. 18187170.8, Extended European Search Report dated Apr. 24, 2019, 8 pages.

D. Farinacci et al. "Generic Routing Encapsulation (GRE)," Network Working Group, RFC 2784, Mar. 2000, 9 pages.

G. Dommety, "Key and Sequence Number Extensions to GRE," Network Working Group, RFC 2890, Sep. 2000, 7 pages.

\* cited by examiner

PACKET PROCESSING METHOD AND DEVICE

CROSS-REFERENCE TO RELATED APPLICATIONS

This application is a continuation application of U.S. patent application Ser. No. 14/992,246 filed on Jan. 11, 2016, which is a continuation application of International Patent Application No. PCT/CN2013/079328 filed on Jul. 12, 2013, which are incorporated by reference.

TECHNICAL FIELD

Embodiments of the present application relate to communications technologies, and in particular, to a packet processing method and a device.

BACKGROUND

A home gateway links an access network outside of a family to a network inside the family and manages a home area network by hiding complex network configuration from a user.

With an increase in home area network applications, home applications and digital services available for home users are also increasing. The home area network becomes a highly dynamic environment, and a home area network device may access the home area network by using a wired network or a wireless network at any time. When the home area network device accesses the home area network, a home gateway corresponding to the home area network receives an uplink data packet sent by the home area network device, and directly forwards the uplink data packet to the Internet by using a physical line; or the home gateway receives a downlink data packet sent by the Internet by using the physical line and then forwards the downlink data packet to the home area network device.

Because an addition of a physical line costs lots of manpower and material resources, transmission bandwidth between the home gateway and the Internet is restricted by the physical line and is difficult to improve, and transmission efficiency is low.

SUMMARY

Embodiments of the present application provide a packet processing method and a device, so as to increase bandwidth.

According to a first aspect, an embodiment of the present application provides a packet processing method, including: receiving, by an aggregation gateway, a first tunnel establishment request message sent by a home gateway, where the first tunnel establishment request message is used to request for establishing a first tunnel, and the first tunnel establishment request message includes an identifier of the home gateway and a first address, and a first source address of the first tunnel is the first address, a destination address of the first tunnel is an address of the aggregation gateway, and the first address is an address of the home gateway on a first access network, where the address is obtained by the home gateway; sending, by the aggregation gateway, a first tunnel establishment success message to the home gateway to respond to the first tunnel establishment request message; receiving, by the aggregation gateway, a second tunnel establishment request message sent by the home gateway, where the second tunnel establishment request message is used to request for establishing a second tunnel, and the second tunnel establishment request message includes the identifier of the home gateway and a second address, and a second source address of the second tunnel is the second address; a destination address of the second tunnel is the address of the aggregation gateway, and the second address is an address of the home gateway on the second access network, where the address is obtained by the home gateway; sending, by the aggregation gateway, a second tunnel establishment success message to the home gateway to respond to the second tunnel establishment request message; and associating, by the aggregation gateway, the first tunnel with the second tunnel according to the identifier of the home gateway, and sending a downlink data packet to the home gateway by using the first tunnel and/or the second tunnel.

With reference to the first aspect, in a first possible implementation manner of the first aspect, the sending, by the aggregation gateway, a downlink data packet to the home gateway by using the first tunnel and/or the second tunnel includes: performing, by the aggregation gateway, Generic Routing Encapsulation GRE for the downlink data packet to obtain a downlink GRE packet, where the downlink GRE packet includes a downlink serial number, and the downlink serial number is used to indicate a sequence in which the aggregation gateway sends the downlink GRE packet; and sending, by the aggregation gateway, the downlink GRE packet to the home gateway by using the first tunnel and/or the second tunnel.

With reference to the first possible implementation manner of the first aspect, in a second possible implementation manner of the first aspect, where before the sending, by the aggregation gateway, a downlink data packet to the home gateway by using the first tunnel and/or the second tunnel, the method further includes: determining, by the aggregation gateway, whether available bandwidth of the first tunnel is less than bandwidth required for transmitting the downlink data packet; and if the available bandwidth of the first tunnel is not less than the bandwidth required for transmitting the downlink data packet, selecting, by the aggregation gateway, to send the downlink data packet to the home gateway by using the first tunnel.

With reference to the first aspect and any one of the first and second possible implementation manners of the first aspect, in a third possible implementation manner of the first aspect, the method further includes: receiving, by the aggregation gateway, an uplink GRE packet sent by the home gateway by using the first tunnel and/or the second tunnel, and decapsulating the uplink GRE packet to obtain an uplink data packet and an uplink serial number corresponding to the uplink data packet; determining, by the aggregation gateway, whether the uplink serial number is equal to a serial number supposed to be sent at the current moment, where the serial number supposed to be sent at the current moment is a serial number of the last uplink data packet that has already been sent by the aggregation gateway at the current moment plus a constant value, and the constant value is a natural number; if the uplink serial number is equal to the serial number supposed to be sent at the current moment, sending, by the aggregation gateway, the uplink data packet corresponding to the uplink serial number; and if the uplink serial number is not equal to the serial number supposed to be sent at the current moment, caching, by the aggregation gateway, the uplink data packet corresponding to the uplink data packet.

With reference to the first aspect and any one of the first to third possible implementation manners of the first aspect, in a fourth possible implementation manner of the first aspect, where before the sending, by the aggregation gateway, a downlink data packet to the home gateway by using the first tunnel and/or the second tunnel, the method further includes: receiving, by the aggregation gateway, bandwidth information of the first tunnel and bandwidth information of the second tunnel, where the bandwidth information is sent by the home gateway; and determining, by the aggregation gateway, the available bandwidth of the first tunnel and available bandwidth of the second tunnel according to the bandwidth information.

According to a second aspect, an embodiment of the present application provides a packet processing method, including: obtaining, by a home gateway, a first address of the home gateway on a first access network, and establishing a first tunnel from the home gateway to an aggregation gateway according to the first address, where a source address of the first tunnel is the first address, and a destination address of the first tunnel is an address of the aggregation gateway; obtaining, by the home gateway, a second address of the home gateway on a second access network, and establishing a second tunnel from the home gateway to the aggregation gateway according to the second address, where a source address of the second tunnel is the second address, and a destination address of the second tunnel is the address of the aggregation gateway; and receiving, by the home gateway, an uplink data packet sent by a user equipment, and sending the uplink data packet to the aggregation gateway by using the first tunnel and/or the second tunnel.

With reference to the second aspect, in a first possible implementation manner of the second aspect, where the establishing, by the home gateway, a first tunnel from the home gateway to an aggregation gateway, includes: sending, by the home gateway, a first tunnel establishment request message to the aggregation gateway by using the first access network, where the first tunnel establishment request message is used to request for establishing the first tunnel, and the first tunnel establishment request message includes an identifier of the home gateway and the first address; and receiving, by the home gateway, a first tunnel establishment success message sent by the aggregation gateway; the establishing, by the home gateway, a second tunnel from the home gateway to the aggregation gateway according to the second address, includes: sending, by the home gateway, a second tunnel establishment request message to the aggregation gateway by using the second access network, where the second tunnel establishment request message is used to request for establishing the second tunnel, and the second tunnel establishment request message includes the identifier of the home gateway and the second address; and receiving, by the home gateway, a second tunnel establishment success message sent by the aggregation gateway.

With reference to the second aspect or the first possible implementation manner of the second aspect, in a second possible implementation manner of the second aspect, the obtaining, by a home gateway, a first address of the home gateway on a first access network, includes: sending, by the home gateway, an IP address request message to a first gateway corresponding to the first access network; and receiving, by the home gateway, an IP address response message sent by the first gateway, where the IP address response message includes the first address of the home gateway on the first access network, and the first address is a first IP address; the obtaining, by the home gateway, a second address of the home gateway on a second access network, includes: sending, by the home gateway, an IP address request message to a second gateway corresponding to the second access network; and receiving, by the home gateway, an IP address response message sent by the second gateway, where the IP address response message includes the second address of the home gateway on the second access network, and the second address is a second IP address.

With reference to the second aspect and any one of the first and second possible implementation manners of the second aspect, in a third possible implementation manner of the second aspect, the sending, by the home gateway, the uplink data packet to the aggregation gateway by using the first tunnel and/or the second tunnel includes: performing, by the home gateway, Generic Routing Encapsulation GRE for the uplink data packet to obtain an uplink GRE packet, where the uplink GRE packet includes an uplink serial number, and the uplink serial number is used to indicate a sequence in which the home gateway sends the uplink GRE packet; and sending, by the home gateway, the uplink GRE packet to the aggregation gateway by using the first tunnel and/or the second tunnel.

With reference to the third possible implementation manner of the second aspect, in a fourth possible implementation manner of the second aspect, before the sending, by the home gateway, the uplink data packet to the aggregation gateway by using the first tunnel and/or the second tunnel, the method further includes: determining, by the home gateway, whether available bandwidth of the first tunnel is less than bandwidth required for transmitting the uplink data packet; selecting, by the home gateway, to send the uplink data packet to the aggregation gateway by using the first tunnel when it is determined that the available bandwidth of the first tunnel is not less than the bandwidth required for transmitting the uplink data packet; and selecting, by the home gateway, to send the uplink data packet to the aggregation gateway by using the second tunnel when it is determined that the available bandwidth of the first tunnel is less than the bandwidth required for transmitting the uplink data packet.

With reference to the second aspect and any one of the first to fourth possible implementation manners of the second aspect, in a fifth possible implementation manner of the second aspect, the method further includes: receiving, by the home gateway, a downlink GRE packet sent by the aggregation gateway by using the first tunnel and/or the second tunnel, and decapsulating the downlink GRE packet to obtain a downlink data packet and a downlink serial number corresponding to the downlink data packet; determining, by the home gateway, whether the downlink serial number is equal to a serial number supposed to be sent at the current moment, where the serial number supposed to be sent at the current moment is a serial number of the last downlink data packet that has already been sent by the home gateway at the current moment plus a constant value, and the constant value is a natural number; if the downlink serial number is equal to the serial number supposed to be sent at the current moment, sending, by the home gateway, the downlink data packet corresponding to the downlink serial number; and if the downlink serial number is not equal to the serial number supposed to be sent at the current moment, caching, by the home gateway, the downlink data packet corresponding to the downlink serial number.

With reference to the fourth possible implementation manner of the second aspect, in a sixth possible implementation manner of the second aspect, where before the sending, by the home gateway, the uplink data packet to the aggregation gateway by using the first tunnel and/or the second tunnel, the method further includes: determining, by the home gateway, to send the uplink data packet to the aggregation gateway by using the first tunnel and/or the second tunnel according to a routing policy.

With reference to the second aspect and the first to sixth possible implementation manners of the second aspect, in a seventh possible implementation manner of the second aspect, after the establishing, by the home gateway, a second tunnel from the home gateway to the aggregation gateway according to the second address, the method further includes: sending, by the home gateway, bandwidth information of the first tunnel and bandwidth information of the second tunnel to the aggregation gateway, so as to enable the aggregation gateway to determine the available bandwidth of the first tunnel and available bandwidth of the second tunnel.

According to a third aspect, an embodiment of the present application provides an aggregation gateway, including: a first tunnel establishing module configured to receive a first tunnel establishment request message sent by a home gateway, where the first tunnel establishment request message is used to request for establishing a first tunnel, and send a first tunnel establishment success message to the home gateway, and the first tunnel establishment request message includes an identifier of the home gateway and a first address, and a first source address of the first tunnel is the first address, a destination address of the first tunnel is an address of the aggregation gateway, and the first address is an address of the home gateway on a first access network, where the address is obtained by the home gateway; a second tunnel establishing module configured to receive a second tunnel establishment request message sent by the home gateway, where the second tunnel establishment request message is used to request for establishing a second tunnel, and send a second tunnel establishment success message to the home gateway, and the second tunnel establishment request message includes the identifier of the home gateway and a second address, and a second source address of the second tunnel is the second address; a destination address of the second tunnel is the address of the aggregation gateway, and the second address is an address of the home gateway on a second access network, where the address is obtained by the home gateway; an associating module configured to associate the first tunnel with the second tunnel according to the identifier of the home gateway; and a sending module configured to send a downlink data packet to the home gateway by using the first tunnel and/or the second tunnel.

With reference to the third aspect, in a first possible implementation manner of the third aspect, the sending module is specifically configured to: perform Generic Routing Encapsulation GRE for the downlink data packet to obtain a downlink GRE packet, where the downlink GRE packet includes a downlink serial number, and the downlink serial number is used to indicate a sequence in which the aggregation gateway sends the downlink GRE packet; and send the downlink GRE packet to the home gateway by using the first tunnel and/or the second tunnel.

With reference to the first possible implementation manner of the third aspect, in a second possible implementation manner of the third aspect, the method further includes: a selecting module, where before the sending module sends the downlink data packet to the home gateway by using the first tunnel and/or the second tunnel, the selecting module is configured to determine whether available bandwidth of the first tunnel is less than bandwidth required for transmitting the downlink data packet; and to select to trigger the sending module to send the downlink data packet to the home gateway by using the first tunnel when it is determined that the available bandwidth of the first tunnel is not less than the bandwidth required for transmitting the downlink data packet, and to select to trigger the sending module to send the downlink data packet to the home gateway by using the second tunnel when it is determined that the available bandwidth of the first tunnel is less than the bandwidth required for transmitting the downlink data packet.

With reference to the third aspect and any one of the first and second possible implementation manners of the third aspect, in a third possible implementation manner of the third aspect, the aggregation gateway further includes: a decapsulating module configured to receive an uplink GRE packet sent by the home gateway by using the first tunnel and/or the second tunnel, and decapsulate the uplink GRE packet to obtain an uplink data packet and a serial number corresponding to the uplink data packet; and a forwarding module configured to determine whether the uplink serial number is equal to a serial number supposed to be sent at the current moment, where the serial number supposed to be sent at the current moment is a serial number of the last uplink data packet that has already been sent by the aggregation gateway at the current moment plus a constant value, where the constant value is a natural number; if the uplink serial number is equal to the serial number supposed to be sent at the current moment, send the uplink data packet corresponding to the uplink serial number; and if the uplink serial number is not equal to the serial number supposed to be sent at the current moment, cache the uplink data packet corresponding to the uplink serial number.

With reference to the third aspect and any one of the first to third possible implementation manners of the third aspect, in a fourth possible implementation manner of the third aspect, the aggregation gateway further includes: a bandwidth determining module configured to, before the sending module sends the downlink data packet to the home gateway by using the first tunnel and/or the second tunnel, receive bandwidth information of the first tunnel and bandwidth information of the second tunnel, where the bandwidth information is sent by the home gateway, and determine the available bandwidth of the first tunnel and available bandwidth of the second tunnel according to the bandwidth information.

According to a fourth aspect, an embodiment of the present application provides a home gateway, including: a first obtaining module configured to obtain a first address of the home gateway on a first access network; a first tunnel establishing module, configure to establish a first tunnel from the home gateway to an aggregation gateway according to the first address, where a source address of the first tunnel is the first address, and a destination address of the first tunnel is an address of the aggregation gateway; a second obtaining module configured to obtain a second address of the home gateway on a second access network; a second tunnel establishing module configured to establish a second tunnel from the home gateway to the aggregation gateway according to the second address, where a source address of the second tunnel is the second address, and a destination address of the second tunnel is the address of the aggregation gateway; and a processing module configured to receive an uplink data packet sent by a user equipment and send the uplink data packet to the aggregation gateway by using the first tunnel and/or the second tunnel.

With reference to the fourth aspect, in a first possible implementation manner of the fourth aspect, the first tunnel establishing module is specifically configured to: send a first tunnel establishment request message to the aggregation gateway by using the first access network, where the first tunnel establishment request message is used to request for establishing the first tunnel, and the first tunnel establishment request message includes an identifier of the home gateway and the first address; and receive a first tunnel establishment success message sent by the aggregation gateway; the second tunnel establishing module is specifically configured to: send a second tunnel establishment request message to the aggregation gateway by using the second access network, where the second tunnel establishment request message is used to request for establishing the second tunnel, and the second tunnel establishment request message includes the identifier of the home gateway and the second address; and receive a second tunnel establishment success message sent by the aggregation gateway.

With reference to the fourth aspect or the first possible implementation manner of the fourth aspect, in a second possible implementation manner of the fourth aspect, the first obtaining module is specifically configured to: send an IP address request message to a first gateway corresponding to the first access network; and receive an IP address response message sent by the first gateway, where the IP address response message includes the first address of the home gateway on the first access network, and the first address is a first IP address; the second obtaining module is specifically configured to: send an IP address request message to a second gateway corresponding to the second access network; and receive an IP address response message sent by the second gateway, where the IP address response message includes the second address of the home gateway on the second access network, and the second address is a second IP address.

With reference to the fourth aspect and any one of the first and second possible implementation manners of the fourth aspect, in a third possible implementation manner of the fourth aspect, the processing module is specifically configured to: receive an uplink data packet sent by a user equipment, and perform Generic Route Encapsulation GRE for the uplink data packet to obtain an uplink GRE packet, where the uplink GRE packet includes an uplink serial number, and the uplink serial number is used to indicate a sequence in which the home gateway sends the uplink GRE packet; and send the uplink GRE packet to the aggregation gateway by using the first tunnel and/or the second tunnel.

With reference to the third possible implementation manner of the fourth aspect, in a fourth possible implementation manner of the fourth aspect, the home gateway further includes: a selecting module configured to, before the processing module sends the uplink data packet to the aggregation gateway by using the first tunnel and/or the second tunnel, determine whether available bandwidth of the first tunnel is less than bandwidth required for transmitting the uplink data packet; to trigger the processing module to select to send the uplink data packet to the aggregation gateway by using the first tunnel when it is determined that the available bandwidth of the first tunnel is not less than bandwidth required for transmitting the uplink data packet, and to trigger the processing module to select to send the uplink data packet by using the second tunnel when it is determined that the available bandwidth of the first tunnel is less than the bandwidth required for transmitting the uplink data packet.

With reference to the fourth aspect and any one of the first to fourth possible implementation manners of the fourth aspect, in a fifth possible implementation manner of the fourth aspect, the home gateway further includes: a decapsulating module configured to receive a downlink GRE packet sent by the aggregation gateway by using the first tunnel and/or the second tunnel, and decapsulate the downlink GRE packet to obtain a downlink data packet and a downlink serial number corresponding to the downlink data packet; and a forwarding module configured to determine whether the downlink serial number is equal to a serial number supposed to be sent at the current moment, where the serial number supposed to be sent at the current moment is a serial number of the last downlink data packet that has already been sent by the home gateway at the current moment plus a constant value, and the constant value is a natural number; if the downlink serial number is equal to the serial number supposed to be sent at the current moment, send the downlink data packet corresponding to the downlink serial number; and if the downlink serial number is not equal to the serial number supposed to be sent at the current moment, cache the downlink data packet corresponding to the downlink serial number.

With reference to the fourth possible implementation manner of the fourth aspect, in a sixth possible implementation manner of the fourth aspect, the home gateway further includes: a tunnel determining module configured to determine, before the processing module sends the uplink data packet to the aggregation gateway by using the first tunnel and/or the second tunnel, to send the uplink data packet to the aggregation gateway by using the first tunnel and/or the second tunnel according to a routing policy.

With reference to the fourth aspect and any one of the first to sixth possible implementation manners of the fourth aspect, in a seventh possible implementation manner of the fourth aspect, the home gateway further includes: an information sending module configured to send, after the second tunnel establishing module establishes the second tunnel from the home gateway to the aggregation gateway according to the second address, bandwidth information of the first tunnel and bandwidth information of the second tunnel to the aggregation gateway, so as to enable the aggregation gateway to determine the available bandwidth of the first tunnel and available bandwidth of the second tunnel.

In a packet processing method and a device according to the embodiments of the present application, an aggregation gateway receives a first tunnel establishment request message sent by a home gateway, and sends a first tunnel establishment success message to the home gateway; the aggregation gateway receives a second tunnel establishment request message sent by the home gateway, and sends a second tunnel establishment success message to the home gateway; the aggregation gateway associates a first tunnel with a second tunnel according to an identifier of the home gateway, and sends a downlink data packet to the home gateway by using the first tunnel and/or the second tunnel, so as to enable maximum available bandwidth to be a sum of preset bandwidth of the first tunnel and preset bandwidth of the second tunnel when the aggregation gateway sends the downlink data packet to the home gateway, thereby increasing transmission bandwidth.

BRIEF DESCRIPTION OF DRAWINGS

To describe the technical solutions in the embodiments of the present application more clearly, the following briefly introduces the accompanying drawings for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Figure 1:
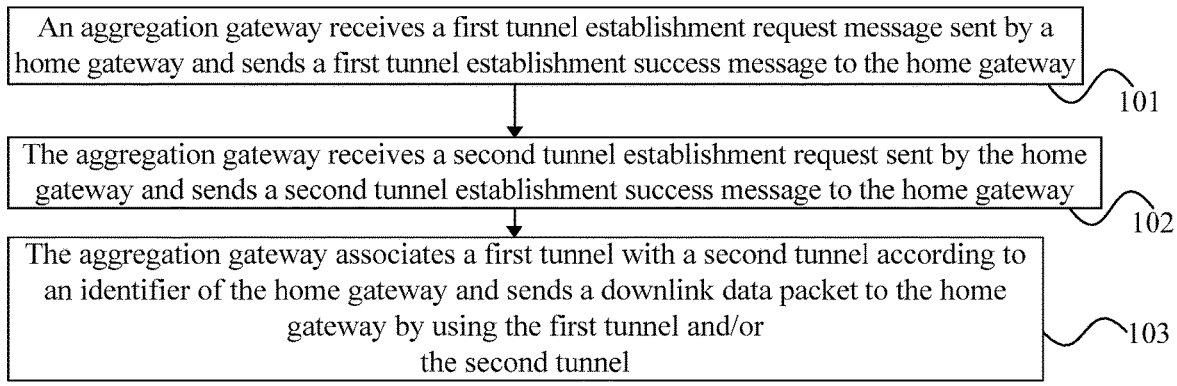
FIG. 1 is a schematic flowchart of a first embodiment of a packet processing method according to the present application.

FIG. 1 is a schematic flowchart of a first embodiment of a packet processing method according to the present application. As shown in FIG. 1, the packet processing method according to this embodiment of the present application may be performed by an aggregation gateway. The aggregation gateway may be implemented by using software and/or hardware. The packet processing method according to this embodiment includes the following steps:

Step 101. The aggregation gateway receives a first tunnel establishment request message sent by a home gateway and sends a first tunnel establishment success message to the home gateway.

The first tunnel establishment request message is used to request for establishing a first tunnel, and the first tunnel establishment request message includes an identifier of the home gateway and a first address. A first source address of the first tunnel is the first address; a destination address of the first tunnel is an address of the aggregation gateway, and the first address is an address of the home gateway on a first access network, where the address is obtained by the home gateway.

Step 102. The aggregation gateway receives a second tunnel establishment request message sent by the home gateway and sends a second tunnel establishment success message to the home gateway.

The second tunnel establishment request message is used to request for establishing a second tunnel; the second tunnel establishment request message includes the identifier of the home gateway and a second address. A second source address of the second tunnel is the second address; a destination address of the second tunnel is the address of the aggregation gateway, and the second address is an address of the home gateway on a second access network, where the address is obtained by the home gateway.

Step 103. The aggregation gateway associates the first tunnel with the second tunnel according to the identifier of the home gateway and sends a downlink data packet to the home gateway by using the first tunnel and/or the second tunnel.

Figure 2:
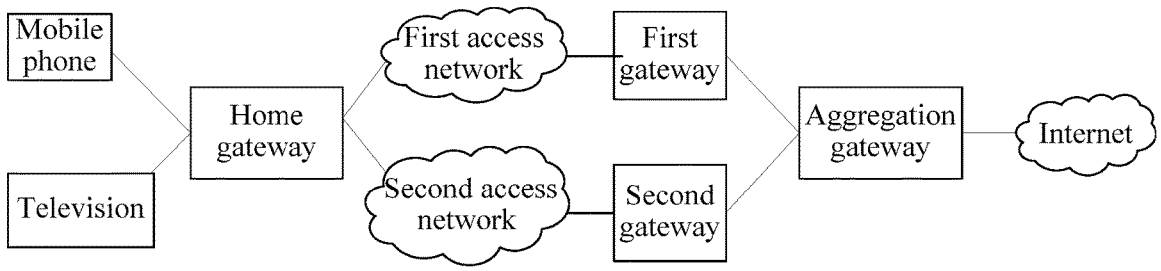
FIG. 2 is a schematic diagram of an application scenario of a packet processing method according to the present application.

In a specific implementation process, this embodiment of the present application may be applicable to an application scenario shown in FIG. 2. FIG. 2 is a schematic diagram of an application scenario of the packet processing method according to the present application. In FIG. 2, a mobile phone accesses, by using the voice over IP (VoIP) technology, a television accesses, by using the Internet Protocol television (IPTV) technology, or another user equipment accesses, by using the prior art, the home gateway. At least two tunnels are established between the home gateway and the aggregation gateway, and transmission of a data packet between the home gateway and the aggregation gateway is implemented by using the at least two tunnels. Optionally, the tunnel in this embodiment may be a Generic Routing Encapsulation (GRE) tunnel.

For ease of description, in this embodiment, two tunnels are used as an example to describe in detail, where the first tunnel is corresponding to the first access network, and the second tunnel is corresponding to the second access network. The first access network and the second access network may be a same type of access networks, or may be different types of access networks. For example, if the first access network and the second access network are different types of access networks, the first access network is a mobile bearer network, and the second access network is a fixed network. A first gateway corresponding to the first access network is a mobile gateway, and a second gateway corresponding to the second access network is a fixed gateway.

During transmission of an uplink data packet, the home gateway sends the uplink data packet to the aggregation gateway by using the first tunnel and/or the second tunnel, and the aggregation gateway forwards the uplink data packet to the Internet. During transmission of a downlink data packet, the aggregation gateway sends the downlink data packet to the home gateway by using the first tunnel and/or the second tunnel, and the home gateway forwards the downlink data packet to a home device on a home area network.

It may be understood by a person skilled in the art that a practical application scenario is much more complex than the application scenario shown in FIG. 2. In a specific application process, a relationship between the home gateway and the aggregation gateway is a many-to-one relationship. That is, a plurality of home gateways are corresponding to one aggregation gateway, where the plurality of home gateways send uplink data packets to the one aggregation gateway, and the one aggregation gateway forwards the uplink data packets sent by the plurality of home gateways to the Internet.

In a specific implementation process, two tunnels need to be established between the aggregation gateway and the home gateway. In addition, the aggregation gateway needs to establish an association relationship between the two tunnels and the home gateway to identify a home gateway corresponding to each tunnel. The following gives a detailed description of an implementation process of this embodiment.

In step 101, the aggregation gateway receives the first tunnel establishment request message sent by the home gateway, where the first tunnel establishment request message is used to request for establishing the first tunnel, and the first tunnel establishment request message includes the identifier of the home gateway and the first address.

When the aggregation gateway determines that a tunnel may be established between the home gateway and the aggregation gateway, the aggregation gateway sends the first tunnel establishment success message to the home gateway. The first tunnel between the aggregation gateway and the home gateway is established at this time.

Specially, the first source address of the first tunnel is the first address, and the first address is the address of the home gateway on the first access network, where the address is obtained by the home gateway; the destination address of the first tunnel is the address of the aggregation gateway. The identifier of the home gateway may be any of source information of the home gateway, where the source information includes, but is not limited to, an IP address, a MAC address, and a user name of the home gateway.

In step 102, the aggregation gateway receives the second tunnel establishment request message sent by the home gateway and sends the second tunnel establishment success message to the home gateway.

The second tunnel establishment request message is used to request for establishing the second tunnel, and the second tunnel establishment request message includes the identifier of the home gateway and the second address. The second source address of the second tunnel is the second address; the destination address of the second tunnel is the address of the aggregation gateway, and the second address is the address of the home gateway on the second access network, where the address is obtained by the home gateway.

For a specific implementation process of establishing the second tunnel in step 102, refer to the specific implementation process of establishing the first tunnel in step 101. Details are not described in this embodiment again. It may be understood by a person skilled in the art that there is no strict time sequence between step 101 and step 102.

In step 103, the aggregation gateway associates the first tunnel with the second tunnel according to the identifier of the home gateway, and sends the downlink data packet to the home gateway by using the first tunnel and/or the second tunnel.

After the first tunnel and the second tunnel are established, the aggregation gateway associates the identifier of the home gateway with the first tunnel and the second tunnel. In a specific implementation process, the aggregation gateway may save, on a local computer, an association relationship between the two tunnels and the identifier of the home gateway by means of table or mapping.

When the aggregation gateway sends the downlink data packet to the home gateway, the aggregation gateway determines the two tunnels corresponding to the home gateway according to the association relationship between the identifier of the home gateway and the two tunnels, and sends the downlink data packet to the home gateway by using the first tunnel and/or the second tunnel.

In a specific implementation process, before step 103, the aggregation gateway receives the downlink data packet sent by the Internet, and determines whether available bandwidth of the first tunnel is less than bandwidth required for transmitting the downlink data packet;

The aggregation gateway selects to send the downlink data packet to the home gateway by using the second tunnel when it is determined that the available bandwidth of the first tunnel is less than the bandwidth required for transmitting the downlink data packet, where available bandwidth of the second tunnel is not less than the bandwidth required for transmitting the downlink data packet.

Specifically, the first tunnel may be an active tunnel for transmitting the downlink data packet, and the second tunnel may be a standby tunnel for transmitting the downlink data packet. The available bandwidth of the first tunnel is currently remaining bandwidth of the first tunnel. When the first tunnel does not transmit other downlink data packets, the available bandwidth of the first tunnel is preset bandwidth of the first tunnel; when the first tunnel transmits the other downlink data packets, the available bandwidth of the first tunnel is a difference between the preset bandwidth of the first tunnel and bandwidth occupied by the other downlink data packets.

The aggregation gateway selects to send the downlink data packet to the home gateway by using the first tunnel when the available bandwidth of the first tunnel is not less than the bandwidth required for transmitting the downlink data packet; the aggregation gateway selects to send the downlink data packet to the home gateway by using the second tunnel when the available bandwidth of the first tunnel is less than the bandwidth required for transmitting the downlink data packet. For example, the aggregation gateway may select to send the downlink data packet to the home gateway by using the first tunnel when the available bandwidth of the first tunnel is equal to the bandwidth required for transmitting the downlink data packet. Optionally, the aggregation gateway may also select to send the downlink data packet to the home gateway by using the second tunnel, where available bandwidth of the second tunnel is not less than the bandwidth required for transmitting the downlink data packet.

In step 103, the aggregation gateway sends the downlink data packet to the home gateway by using the first tunnel and/or the second tunnel. That is, there are two tunnels between the aggregation gateway and the home gateway and the two tunnels may be used for transmitting the downlink data packet. The aggregation gateway selects the first tunnel and/or the second tunnel according to the bandwidth required for transmitting the downlink data packet. It may be understood by a person skilled in the art that, when the aggregation gateway sends the downlink data packet to the home gateway, the maximum available bandwidth is a sum of the preset bandwidth of the first tunnel and preset bandwidth of the second tunnel, whereas the preset bandwidth of the first tunnel is equal to the preset bandwidth of the second tunnel, and both of the two preset bandwidth are bandwidth of a physical line.

In a packet processing method according to this embodiment of the present application, an aggregation gateway receives a first tunnel establishment request message sent by a home gateway, and sends a first tunnel establishment success message to the home gateway; the aggregation gateway receives a second tunnel establishment request message sent by the home gateway, and sends a second tunnel establishment success message to the home gateway; the aggregation gateway associates a first tunnel with a second tunnel according to an identifier of the home gateway, and sends a downlink data packet to the home gateway by using the first tunnel and/or the second tunnel, so as to enable maximum available bandwidth to be a sum of preset bandwidth of the first tunnel and preset bandwidth of the second tunnel when the aggregation gateway sends the downlink data packet, thereby increasing transmission bandwidth.

Figure 3:
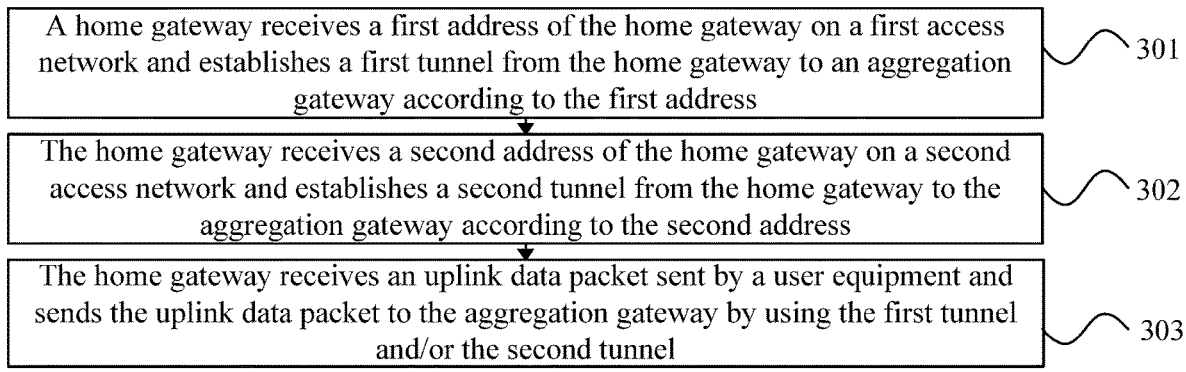
FIG. 3 is a schematic flowchart of a second embodiment of a packet processing method according to the present application.

FIG. 3 is a schematic flowchart of a second embodiment of a packet processing method according to the present application. As shown in FIG. 3, the packet processing method according to this embodiment of the present application may be performed by a home gateway. The home gateway may be implemented by using software and/or hardware. The packet processing method according to this embodiment includes the following steps:

Step 301. The home gateway obtains a first address of the home gateway on a first access network and establishes a first tunnel from the home gateway to an aggregation gateway according to the first address.

A source address of the first tunnel is the first address, and a destination address of the first tunnel is an address of the aggregation gateway.

Step 302. The home gateway obtains a second address of the home gateway on a second access network and establishes a second tunnel from the home gateway to the aggregation gateway according to the second address.

A source address of the second tunnel is the second address, and a destination address of the second tunnel is the address of the aggregation gateway.

Step 303. The home gateway receives an uplink data packet sent by a user equipment and sends the uplink data packet to the aggregation gateway by using the first tunnel and/or the second tunnel.

An application scenario of this embodiment may be that shown in FIG. 2. For specific descriptions, refer to the foregoing embodiment. Details are not described herein again.

This embodiment gives a detailed description of a specific implementation process of establishing the first tunnel and the second tunnel by the home gateway.

In step 301, the home gateway establishes the first tunnel, and the home gateway firstly obtains the first address of the home gateway on the first access network. In a specific implementation process, the first address may be an IP address, a medium access control (MAC) address, and the like. This embodiment sets no special limitations on the first address.

Optionally, the first address may be an IP address. When the first address is the IP address, the home gateway may obtain the first address in two possible implementation manners. One possible implementation manner is: the home gateway statically configures the IP address. The other possible implementation manner is: the home gateway sends an IP address application message to a first gateway corresponding to the first access network; the home gateway receives an IP address response message sent by the first gateway, where the IP address response message includes the first address of the home gateway on the first access network, and the first address is a first IP address.

Then the home gateway establishes the first tunnel from the home gateway to the aggregation gateway according to the first address. Specifically, the home gateway sends a first tunnel establishment request message to the aggregation gateway by using the first access network and receives a first tunnel establishment success message sent by the aggregation gateway.

Specifically, the source address of the first tunnel is the first address, and the destination address of the first tunnel is the address of the aggregation gateway. The home gateway uses the first address as a source address and sends the first tunnel establishment request message that includes the identifier of the home gateway to the aggregation gateway. When the home gateway receives the first tunnel establishment success message, it indicates that the first tunnel is successfully established. The identifier of the home gateway may be any of source information of the home gateway, where the source information includes, but is not limited to, an IP address, an MAC address, and a user name of the home gateway.

In step 302, the home gateway establishes the second tunnel. The home gateway obtains the second address of the home gateway on the second access network and establishes the second tunnel from the home gateway to the aggregation gateway according to the second address.

Specifically, the home gateway sends the second tunnel establishment request message to the aggregation gateway by using the second access network, and the home gateway receives the second tunnel establishment success message sent by the aggregation gateway, where the second tunnel establishment request message includes the identifier of the home gateway, the source address of the second tunnel is the second address, and the destination address of the second tunnel is the address of the aggregation gateway.

An implementation manner of the second tunnel is similar to that of the first tunnel. Details are not described herein again.

In this step, for a specific implementation process of establishing the second tunnel by the home gateway, refer to step 301. Details are not described herein again.

It may be understood by a person skilled in the art that there is no strict time sequence between step 301 and step 302 in a specific application process.

In step 303, the home gateway receives the uplink data packet send by the user equipment that is on a home area network, and the home gateway sends the uplink data packet to the aggregation gateway by using the first tunnel and/or the second tunnel.

In a specific implementation process, before step 303, the home gateway determines whether available bandwidth of the first tunnel is less than bandwidth required for transmitting the uplink data packet.

The home gateway selects to send the uplink data packet to the aggregation gateway by using the first tunnel when it is determined that the available bandwidth of the first tunnel is not less than the bandwidth required for transmitting the uplink data packet.

The home gateway selects to send the uplink data packet to the aggregation gateway by using the second tunnel when it is determined that the available bandwidth of the first tunnel is less than the bandwidth required for transmitting the uplink data packet.

Specifically, the first tunnel may be an active tunnel for transmitting the uplink data packet, and the second tunnel may be a standby tunnel for transmitting the uplink data packet. The available bandwidth of the first tunnel is currently remaining bandwidth of the first tunnel. When the first tunnel does not transmit other uplink data packets, the available bandwidth of the first tunnel is preset bandwidth of the first tunnel. When the first tunnel transmits the other uplink data packets, the available bandwidth of the first tunnel is a difference between the preset bandwidth of the first tunnel and bandwidth occupied by the other uplink data packets.

The aggregation gateway selects to send the uplink data packet to the home gateway by using the first tunnel when the available bandwidth of the first tunnel is not less than the bandwidth required for transmitting the uplink data packet; the aggregation gateway selects to send the uplink data packet to the home gateway by using the second tunnel when the available bandwidth of the first tunnel is less than the bandwidth required for transmitting the uplink data packet.

It may be understood by a person skilled in the art that, when the home gateway sends the uplink data packet to the aggregation gateway, maximum available bandwidth is a sum of the preset bandwidth of the first tunnel and preset bandwidth of the second tunnel, whereas the preset bandwidth of the first tunnel is equal to the preset bandwidth of the second tunnel, and both of the two preset bandwidth are bandwidth of a physical line.

In a packet processing method according to this embodiment of the present application, a home gateway obtains a first address of the home gateway on a first access network and establishes a first tunnel from the home gateway to an aggregation gateway according to the first address; the home gateway obtains a second address of the home gateway on a second access network and establishes a second tunnel from the home gateway to the aggregation gateway according to the second address; the home gateway receives a uplink data packet sent by a user equipment and sends the uplink data packet to the aggregation gateway by using the first tunnel and/or the second tunnel, so as to enable maximum bandwidth to be a sum of preset bandwidth of the first tunnel and preset bandwidth of the second tunnel when the home gateway sends the uplink data packet to the aggregation gateway, thereby increasing transmission bandwidth.

Figure 4:
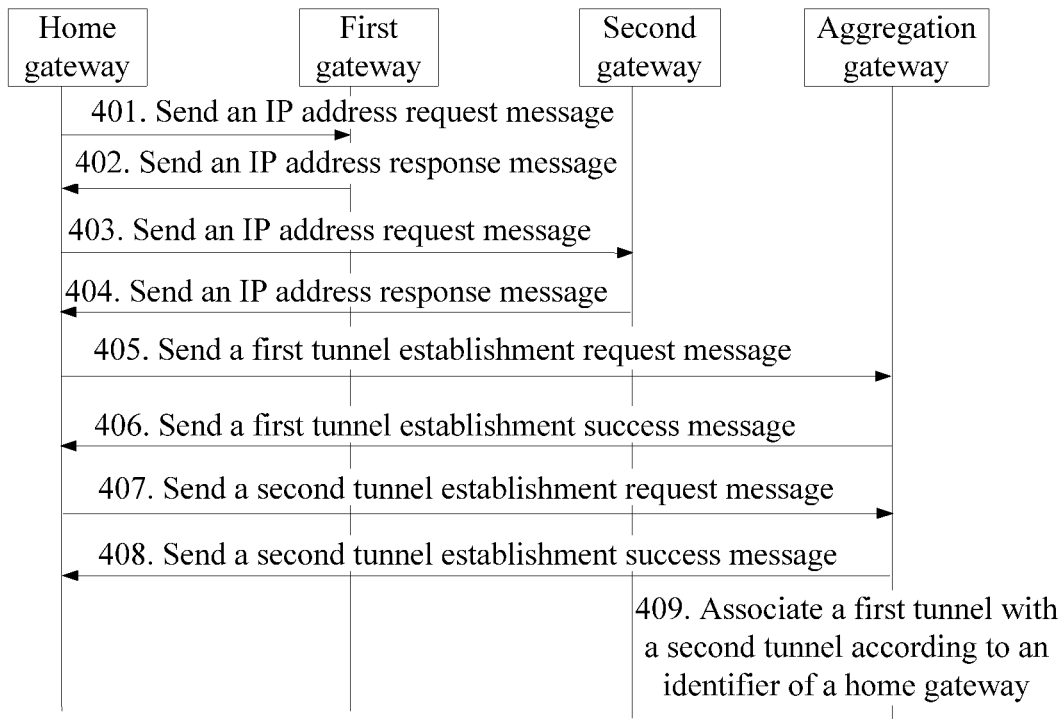
FIG. 4 is a first signaling flowchart of a third embodiment of a packet processing method according to the present application.

FIG. 4 is a first signaling flowchart of a third embodiment of a packet processing method according to the present application. Based on the embodiments shown in FIG. 1 to FIG. 3, this embodiment gives a detailed description of tunnel establishment and association. A specific process is as follows:

Step 401. A home gateway sends an IP address request message to a first gateway.

Step 402. The first gateway sends an IP address response message to the home gateway.

The IP address response message includes a first address of the home gateway on a first access network, and the first address is a first IP address.

Step 403. The home gateway sends an IP address request message to a second gateway.

Step 404. The second gateway sends an IP address response message to the home gateway.

The home gateway receives the IP address response message sent by the second gateway, where the IP address response message includes a second address of the home gateway on a second access network, and the second address is a second IP address.

It may be understood by a person skilled in the art that there is no strict time sequence between step 401 and step 403, or between step 402 and step 404.

Step 405. The home gateway sends a first tunnel establishment request message to an aggregation gateway.

The first tunnel establishment request message includes an identifier of the home gateway and the first address.

Step 406. The aggregation gateway sends a first tunnel establishment success message to the home gateway.

A source address of the first tunnel is the first address, and a destination address of the first tunnel is an address of the aggregation gateway.

Step 407. The home gateway sends a second tunnel establishment request message to the aggregation gateway.

The second tunnel establishment request message includes the identifier of the home gateway and the second address.

Step 408. The aggregation gateway sends a second tunnel establishment success message to the home gateway.

A source address of the second tunnel is the second address, and a destination address of the second tunnel is the address of the aggregation gateway.

It may be understood by a person skilled in the art that there is no strict time sequence between step 405 and step 407, or that there is no strict time sequence between step 406 and step 408.

Step 409. The aggregation gateway associates the first tunnel with the second tunnel according to the identifier of the home gateway.

The aggregation gateway uniformly uses the associated first tunnel and second tunnel as data load channels.

The tunnel established according to this embodiment enables data transmission between the aggregation gateway and the home gateway to be implemented by using tunnels, but not simply by a physical line, thereby avoiding a limitation on bandwidth by a physical line.

Figure 5:
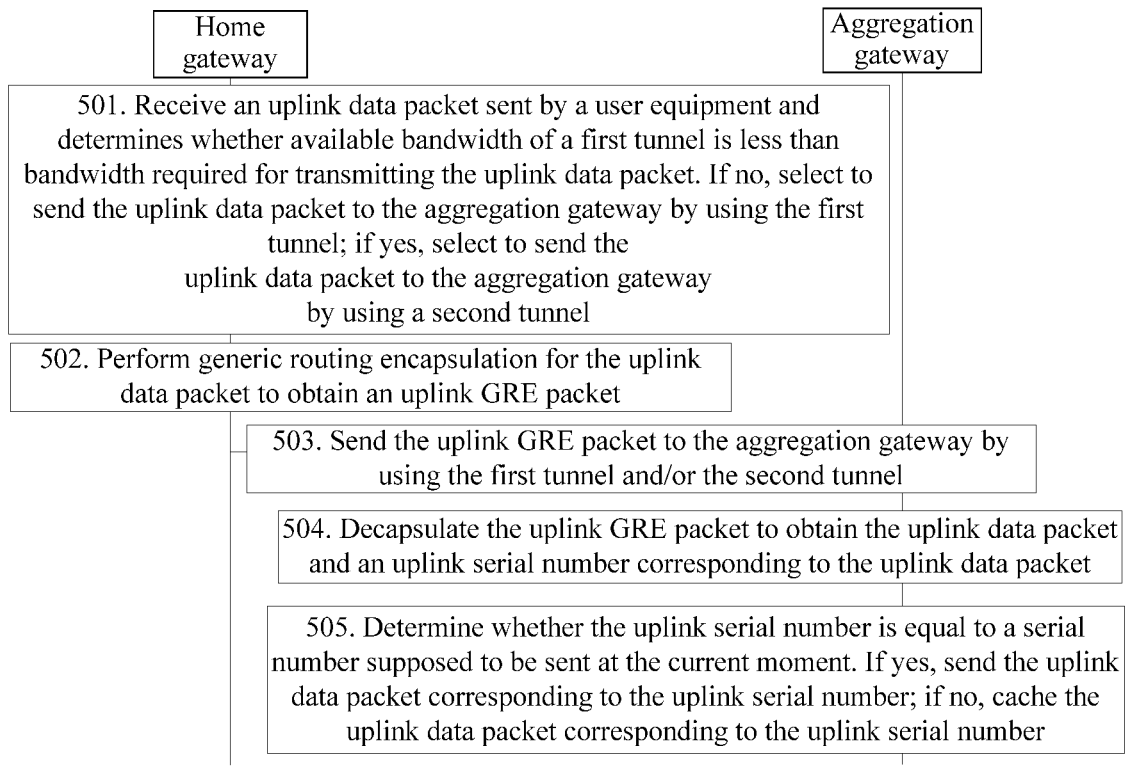
FIG. 5 is a second signaling flowchart of a third embodiment of a packet processing method according to the present application.

FIG. 5 is a second signaling flowchart of a third embodiment of a packet processing method according to the present application. Based on the embodiments shown in FIG. 1 to FIG. 4, this embodiment gives a detailed description of the process of sending the uplink data packet by the home gateway to the aggregation gateway. A specific process is as follows:

Step 501. The home gateway receives the uplink data packet sent by a user equipment and determines whether available bandwidth of the first tunnel is less than bandwidth required for transmitting the uplink data packet. The home gateway selects to send the uplink data packet to the aggregation gateway by using the first tunnel when it is determined that the available bandwidth of the first tunnel is not less than the bandwidth required for transmitting the uplink data packet, and selects to send the uplink data packet to the aggregation gateway by using the second tunnel when it is determined that the available bandwidth of the first tunnel is less than the bandwidth required for transmitting the uplink data packet.

In a specific implementation process, the home gateway, after receiving the uplink data packet sent by the user equipment, determines whether to send the uplink data packet to the aggregation gateway by using the first tunnel and/or the second tunnel according to a routing policy. The routing policy may be: when bandwidth of a physical line cannot meet the bandwidth required for transmitting the uplink data packet, or a network condition of the physical line is poor, the home gateway determines to select to send the uplink data packet to the aggregation gateway by using the first tunnel and/or the second tunnel; when the bandwidth of the physical line may meet the bandwidth required for transmitting the uplink data packet, or a network condition of the first tunnel and/or the second tunnel is poor, the home gateway may select to send the uplink data packet on the physical line. This embodiment sets no special limitations on a specific implementation manner of the routing policy.

When the home gateway determines to send the uplink data packet to the aggregation gateway by using the first tunnel and/or the second tunnel, the home gateway determines whether the available bandwidth of the first tunnel is less than the bandwidth required for transmitting the uplink data packet. The home gateway selects to send the uplink data packet to the aggregation gateway by using the first tunnel when it is determined that the available bandwidth of the first tunnel is not less than the bandwidth required for transmitting the uplink data packet, and selects to send the uplink data packet to the aggregation gateway by using the second tunnel when it is determined that the available bandwidth of the first tunnel is less than the bandwidth required for transmitting the uplink data packet.

Step 502. The home gateway performs Generic Routing Encapsulation for the uplink data packet to obtain an uplink GRE packet.

When the home gateway selects to send the uplink data packet to the aggregation gateway by using the first tunnel and/or the second tunnel, the home gateway performs Generic Routing Encapsulation for the uplink data packet to obtain the uplink GRE packet. Specifically, an uplink data packet that needs to be encapsulated and transmitted by the home gateway is referred to as payload, and a protocol type of the payload is passenger protocol. After receiving a payload, the home gateway first performs GRE encapsulation for the payload by using an encapsulation protocol. That is, the home gateway "packs" a passenger protocol packet and adds a GRE header to form the GRE packet; and then encapsulates the original packet that has already been encapsulated and the GRE header into a packet of another protocol. For example, the another protocol is an IP protocol. Then, the aggregation gateway encapsulates the original packet that has already been encapsulated and the GRE header into a packet of the IP protocol, so that an IP layer can fully take charge of forwarding of the packet.

Specially, an uplink serial number is encapsulated to the GRE header, where the uplink serial number is used to indicate a sequence in which the home gateway sends the uplink GRE packet. For example, when the home gateway continuously sends three uplink data packets to the aggregation gateway by using the first tunnel, the uplink serial numbers corresponding to the three uplink data packets are 1, 2, and 3 respectively; when the home gateway sends two uplink data packets to the aggregation gateway by using the second tunnel, the uplink serial numbers of the two uplink data packets are 4 and 5 respectively.

Step 503. The home gateway sends the uplink GRE packet to the aggregation gateway by using the first tunnel and/or the second tunnel.

Step 504. The aggregation gateway decapsulates the GRE uplink data packet to obtain the uplink data packet and an uplink serial number corresponding to the uplink data packet.

Correspondingly, after receiving the uplink GRE packet, the aggregation gateway decapsulates the uplink GRE packet to obtain the uplink data packet and the uplink serial number that is in the GRE packet header and corresponds to the uplink data packet.

Step 505. The aggregation gateway determines whether the uplink serial number is equal to a serial number supposed to be sent at the current moment. If the uplink serial number is equal to the serial number supposed to be sent at the current moment, the aggregation gateway sends the uplink data packet corresponding to the uplink serial number; if the uplink serial number is not equal to the serial number supposed to be sent at the current moment, the aggregation gateway caches the uplink data packet corresponding to the uplink serial number.

In a specific implementation process, because the aggregation gateway may receive the uplink data packet sent by the home gateway by using the first tunnel and/or the second tunnel, when the first tunnel and the second tunnel correspond to different access networks and when the first tunnel and the second tunnel carry the uplink data packet, a delay difference between the first tunnel and the second tunnel exists. For example, a first access network corresponding to the first tunnel is an LTE bearer network, and a second access network corresponding to the second tunnel is a DSL bearer network. A phenomenon of out-of-order may occur when the aggregation gateway receives the uplink data packet transmitted by using the first tunnel and/or the second tunnel because of the delay difference between the LTE and the DSL. Therefore, the aggregation gateway and the home gateway may separately maintain the uplink serial number based on the uplink data packet.

For the manner in which the home gateway maintains the uplink serial number, refer to step 502. The maintenance of the uplink serial number by the aggregation gateway is as follows: the aggregation gateway determines whether the uplink serial number is equal to the serial number supposed to be sent at the current moment. Specifically, the serial number supposed to be sent at the current moment is a serial number of the last uplink data packet that has already been sent by the aggregation gateway at the current moment plus a constant value, and the constant value is a natural number. For example, when the aggregation gateway receives two consecutive uplink data packets sent by the home gateway by using the first tunnel, uplink serial numbers corresponding to the two uplink data packets are 1 and 2 respectively. At this time, the aggregation gateway has not forwarded the uplink data packets, the serial numbers supposed to be sent by the aggregation gateway at the current moment are 1 and 2, and the constant value is 1. The aggregation gateway determines that the uplink serial numbers are equal to the serial numbers supposed to be sent at the current moment, and the aggregation gateway forwards the uplink data packets corresponding to the uplink serial numbers 1 and 2 to the Internet.

Then, the aggregation gateway receives an uplink data packet sent by the home gateway by using the second tunnel, and a corresponding preset serial number is 4; however, at this time, the serial number supposed to be sent at the current moment is 3. Therefore, the aggregation gateway determines that the uplink serial number is not equal to the serial number supposed to be sent at the current moment, and the aggregation gateway caches the uplink data packet corresponding to the uplink serial number 4.

Then, the aggregation gateway receives the uplink data packet sent by the home gateway by using the first tunnel, and a corresponding preset serial number is 3. However, at this time, the serial number supposed to be sent at the current moment is 4. Therefore, the aggregation gateway determines that the uplink serial number is not equal to the serial number supposed to be sent at the current moment, and the aggregation gateway caches the uplink data packet corresponding to the uplink serial number 3. The aggregation gateway detects, within a preset time, whether the uplink serial numbers in a cache are consecutive. When the uplink serial numbers in the cache are consecutive, the aggregation gateway forwards the uplink data packets corresponding to the uplink serial numbers to the Internet. For example, when detecting that the uplink serial numbers 3 and 4 in a preset cache are consecutive; the aggregation gateway forwards the uplink packets corresponding to the uplink serial numbers 3 and 4 to the Internet.

According to this embodiment of the present application, a home gateway sends an uplink data packet to an aggregation gateway, which not only increases bandwidth by using two tunnels, but also ensures that the aggregation gateway forwards the uplink data packet to the Internet in a correct sequence.

Figure 6:
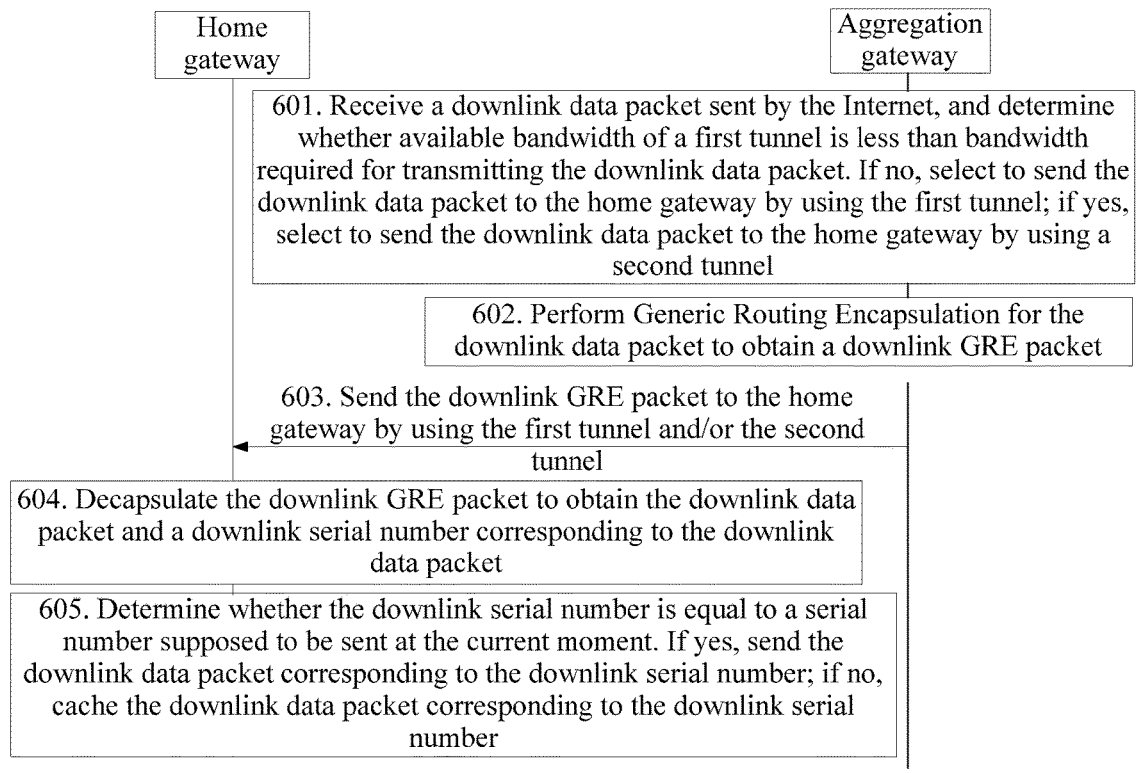
FIG. 6 is a third signaling flowchart of a third embodiment of a packet processing method according to the present application.

FIG. 6 is a third signaling flowchart of a third embodiment of a packet processing method according to the present application. Based on the embodiments shown in FIG. 1 to FIG. 5, this embodiment gives a detailed description of a process of sending a downlink data packet by the aggregation gateway to the home gateway. A specific process is as follows:

Step 601. The aggregation gateway receives the downlink data packet sent by the Internet, and determines whether the available bandwidth of the first tunnel is less than the bandwidth required for transmitting the downlink data packet. The aggregation gateway selects to send the downlink data packet to the home gateway by using the second tunnel when it is determined that the available bandwidth of the first tunnel is less than the bandwidth required for transmitting the downlink data packet, where the available bandwidth of the second tunnel is not less than the bandwidth required for transmitting the downlink data packet.

Optionally, before step 601, the home gateway sends bandwidth information of the first tunnel and bandwidth information of the second tunnel to the aggregation gateway; the aggregation gateway receives the bandwidth information of the first tunnel and the bandwidth information of the second tunnel, where the bandwidth information is sent by the home gateway; the aggregation gateway determines the available bandwidth of the first tunnel and the available bandwidth of the second tunnel according to the bandwidth information. Specifically, the bandwidth information includes preset bandwidth of the first tunnel and preset bandwidth of the second tunnel, that is, maximum bandwidth of the first tunnel and the second tunnel. The aggregation gateway may determine maximum available bandwidth of the first tunnel and the second tunnel according to the bandwidth information. When downlink data has been transmitted by using the first tunnel and the second tunnel, the aggregation gateway may determine current available bandwidth according to the bandwidth information.

Step 602. The aggregation gateway performs Generic Routing Encapsulation for the downlink data packet to obtain a downlink GRE packet.

In this embodiment, for the implementation manner in which the aggregation gateway performs GRE encapsulation for the downlink data packet to obtain the downlink GRE data, refer to step 502. Details are not described herein again.

Step 603. The aggregation gateway sends the downlink GRE packet to the home gateway by using the first tunnel and/or the second tunnel.

Step 604. The home gateway decapsulates the downlink GRE packet to obtain the downlink data packet and a downlink serial number corresponding to the downlink data packet.

Step 605. The home gateway determines whether the downlink serial number is equal to a serial number supposed to be sent at the current moment. If the downlink serial number is equal to the serial number supposed to be sent at the current moment, the home gateway sends the downlink data packet corresponding to the downlink serial number; if the downlink serial number is not equal to the serial number supposed to be sent at the current moment, the home gateway caches the downlink data packet corresponding to the downlink serial number.

In this embodiment, an implementation manner of step 605 is similar to that of step 505. Details are not described herein again.

According to this embodiment of the present application, an aggregation gateway sends a downlink data packet to a home gateway, which not only increases bandwidth by using two tunnels, but also ensures that the home gateway forwards the downlink data packet to a user equipment in a correct sequence.

Figure 7:
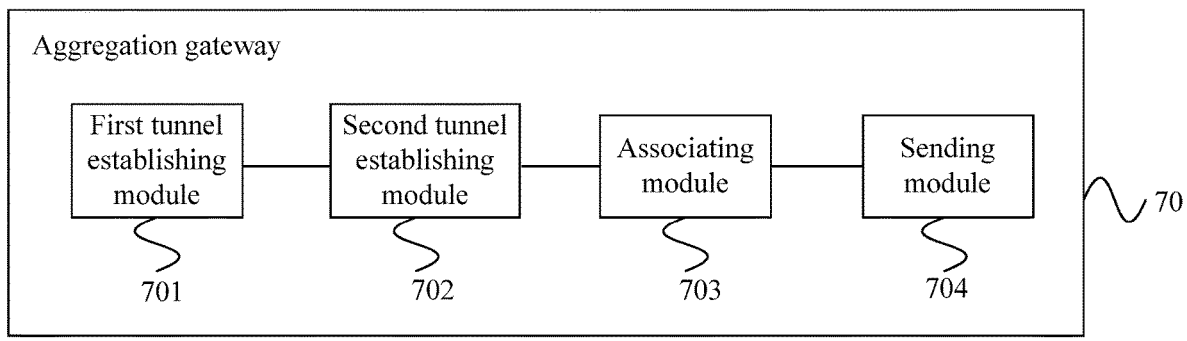
FIG. 7 is a schematic structural diagram of a first embodiment of an aggregation gateway according to the present application.

FIG. 7 is a schematic structural diagram of a first embodiment of an aggregation gateway according to the present application. As shown in FIG. 7, an aggregation gateway 70 according to this embodiment of the present application includes a first tunnel establishing module 701, a second tunnel establishing module 702, an associating module 703, and a sending module 704.

The first tunnel establishing module 701 is configured to receive a first tunnel establishment request message sent by a home gateway, where the first tunnel establishment request message is used to request for establishing a first tunnel, and send a first tunnel establishment success message to the home gateway. The first tunnel establishment request message includes an identifier of the home gateway and a first address; a first source address of the first tunnel is the first address, and a destination address of the first tunnel is an address of the aggregation gateway. The first address is an address of the home gateway on a first access network, where the address is obtained by the home gateway.

The second tunnel establishing module 702 is configured to receive a second tunnel establishment request message sent by the home gateway, where the second tunnel establishment request message is used to request for establishing a second tunnel, and send a second tunnel establishment success message to the home gateway. The second tunnel establishment request message includes the identifier of the home gateway and a second address; a second source address of the second tunnel is the second address, and a destination address of the second tunnel is the address of the aggregation gateway. The second address is an address of the home gateway on a second access network, where the address is obtained by the home gateway.

The associating module 703 is configured to associate the first tunnel with the second tunnel according to the identifier of the home gateway.

The sending module 704 is configured to send a downlink data packet to the home gateway by using the first tunnel and/or the second tunnel.

An aggregation gateway in this embodiment may be applicable to the technical solutions described in a first embodiment of a packet processing method. Implementation principles and technical effects are similar. Details are not described herein again.

Figure 8:
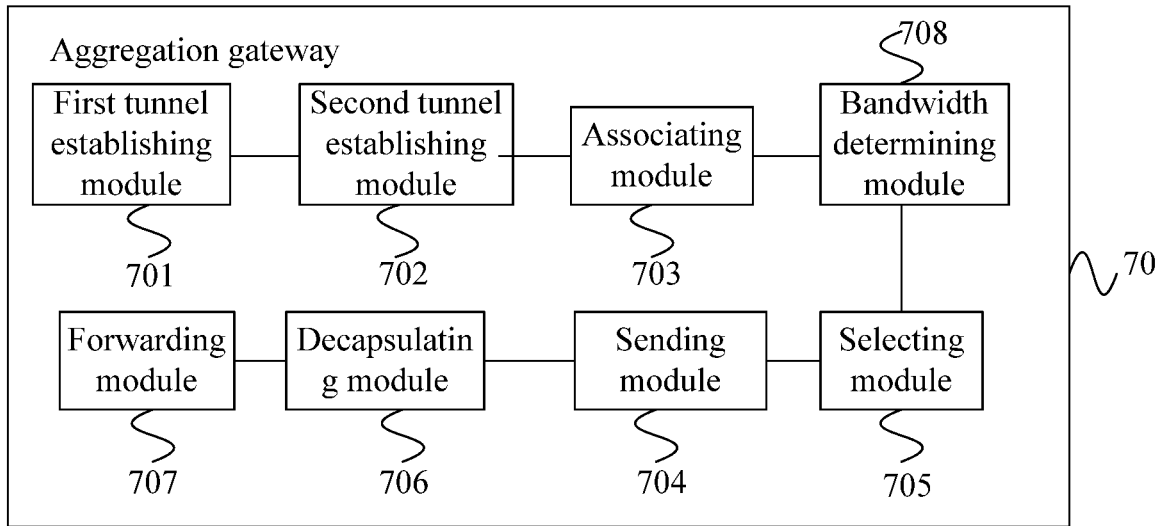
FIG. 8 is a schematic structural diagram of a second embodiment of an aggregation gateway according to the present application.

FIG. 8 is a schematic structural diagram of a second embodiment of an aggregation gateway according to the present application. As shown in FIG. 8, this embodiment is implemented based on the embodiment shown in FIG. 7. A specific implementation manner is as follows:

Optionally, the sending module 704 is specifically configured to: perform Generic Routing Encapsulation GRE for the downlink data packet to obtain a downlink GRE packet, wherein the downlink GRE packet includes a downlink serial number, and the downlink serial number is used to indicate a sequence in which the aggregation gateway sends the downlink GRE packet; and send the downlink GRE packet to the home gateway by using the first tunnel and/or the second tunnel.

Optionally, the aggregation gateway further includes a selecting module 705. The selecting module is configured to, before the sending module sends the downlink data packet to the home gateway by using the first tunnel and/or the second tunnel, determine whether available bandwidth of the first tunnel is less than bandwidth required for transmitting the downlink data packet; to trigger the sending module that selects to send the downlink data packet to the home gateway by using the first tunnel when it is determined that the available bandwidth of the first tunnel is not less than the bandwidth required for transmitting the downlink data packet; and to trigger the sending module to select to send the downlink data packet to the home gateway by using the second tunnel when it is determined that the available bandwidth of the first tunnel is less than the bandwidth required for transmitting the downlink data packet.

Optionally, the aggregation gateway further includes a decapsulating module 706 configured to receive an uplink GRE packet sent by the home gateway by using the first tunnel and/or the second tunnel, and decapsulate the uplink GRE packet to obtain an uplink data packet and an uplink serial number corresponding to the uplink data packet; and a forwarding module 707 configured to determine whether the uplink serial number is equal to a serial number supposed to be sent at the current moment, where the serial number supposed to be sent at the current moment is a serial number of the last uplink data packet that has already been sent by the aggregation gateway at the current moment plus a constant value, and the constant value is a natural number.

If the uplink serial number is equal to the serial number supposed to be sent at the current moment, the forwarding module 707 sends the uplink data packet corresponding to the uplink serial number.

If the uplink serial number is not equal to the serial number supposed to be sent at the current moment, the forwarding module 707 caches the uplink data packet corresponding to the uplink serial number.

Optionally, the aggregation gateway further includes a bandwidth determining module 708 configured to receive, before sending the downlink data packet to the home gateway by using the first tunnel and/or the second tunnel, bandwidth information of the first tunnel and bandwidth information of the second tunnel, where the bandwidth information is sent by the home gateway, and determine the available bandwidth of the first tunnel and available bandwidth of the second tunnel according to the bandwidth information.

An aggregation gateway according to this embodiment may be configured to perform the technical solutions described in the foregoing method embodiments. Implementation principles and technical effects are similar. Details are not described herein again.

Figure 9:
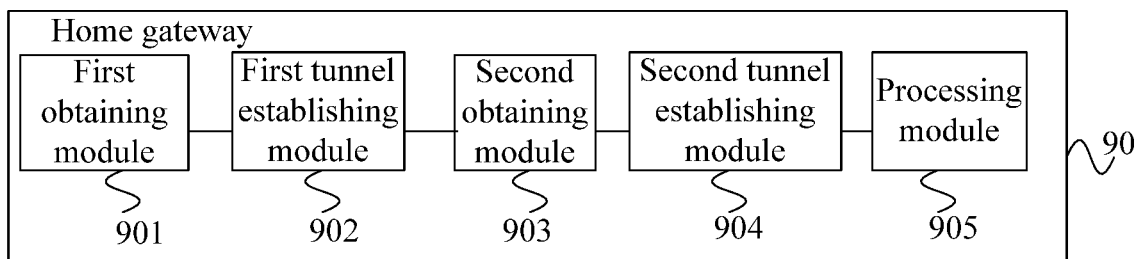
FIG. 9 is a schematic structural diagram of a first embodiment of a home gateway according to the present application.

FIG. 9 is a schematic structural diagram of a first embodiment of a home gateway according to the present application. As shown in FIG. 9, a home gateway 90 according to this embodiment of the present application includes a first obtaining module 901, a first tunnel establishing module 902, a second obtaining module 903, a second tunnel establishing module 904, and a processing module 905.

The first obtaining module 901 is configured to obtain a first address of the home gateway on a first access network.

The first tunnel establishing module 902 is configured to establish a first tunnel from the home gateway to an aggregation gateway according to the first address, where a source address of the first tunnel is the first address, and a destination address of the first tunnel is an address of the aggregation gateway.

The second obtaining module 903 is configured to obtain a second address of the home gateway on a second access network.

The second tunnel establishing module 904 is configured to establish a second tunnel from the home gateway to the aggregation gateway according to the second address, where a source address of the second tunnel is the second address, and a destination address of the second tunnel is the address of the aggregation gateway.

The processing module 905 is configured to receive an uplink data packet sent by a user equipment, and send the uplink data packet to the aggregation gateway by using the first tunnel and/or the second tunnel.

A home gateway of this embodiment may be configured to perform the technical solution described in the second embodiment of the method for processing a packet. Implementation principles and technical effects are similar. Details are not described herein again.

Figure 10:
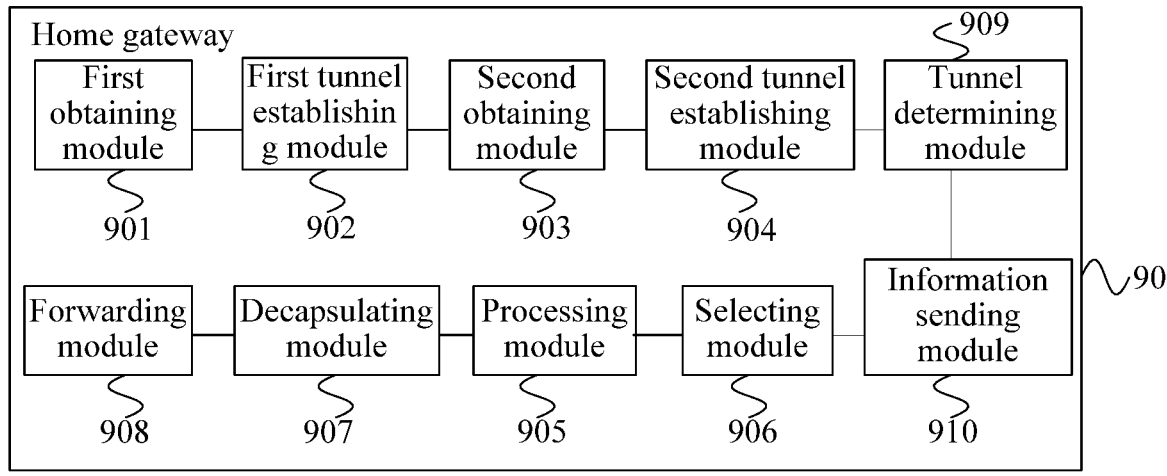
FIG. 10 is a schematic structural diagram of a second embodiment of a home gateway according to the present application.

FIG. 10 is a schematic structural diagram of a second embodiment of a home gateway according to the present application. As shown in FIG. 10, this embodiment is implemented based on the embodiment shown in FIG. 9. A specific implementation manner is as follows:

Optionally, the first tunnel establishing module 902 is specifically configured to: send a first tunnel establishment request message to the aggregation gateway by using the first access network, where the first tunnel establishment request message is used to request for establishing the first tunnel, and the first tunnel establishment request message includes an identifier of the home gateway and the first address; and receive a first tunnel establishment success message sent by the aggregation gateway.

The second tunnel establishing module 904 is specifically configured to: send a second tunnel establishment request message to the aggregation gateway by using the second access network, where the second tunnel establishment request message is used to request for establishing the second tunnel, and the second tunnel establishment request message includes the identifier of the home gateway and the second address; and receive a second tunnel establishment success message sent by the aggregation gateway.

Optionally, the first obtaining module 901 is specifically configured to: send an IP address request message to a first gateway corresponding to the first access network; and receive an IP address response message sent by the first gateway, where the IP address response message includes the first address of the home gateway on the first access network, and the first address is a first IP address.

The second obtaining module 903 is specifically configured to: send an IP address request message to a second gateway corresponding to the second access network; and receive an IP address response message sent by the second gateway, where the IP address response message includes the second address of the home gateway on the second access network, and the second address is a second IP address.

Optionally, the processing module is specifically configured to: receive an uplink data packet sent by a user equipment, and perform Generic Route Encapsulation GRE for the uplink data packet to obtain an uplink GRE packet, where the uplink GRE packet includes an uplink serial number, and the uplink serial number is used to indicate a sequence in which the home gateway sends the uplink GRE packet; and send the uplink GRE packet to the aggregation gateway by using the first tunnel and/or the second tunnel.

Optionally, the home gateway further includes a selecting module 906 configured to, before the processing module sends the uplink data packet to the aggregation gateway by using the first tunnel and/or the second tunnel, determine whether available bandwidth of the first tunnel is less than bandwidth required for transmitting the uplink data packet; to trigger the processing module to select to send the uplink data packet to the aggregation gateway by using the first tunnel when it is determined that the available bandwidth of the first tunnel is not less than the bandwidth required for transmitting the uplink data packet; and to trigger the processing module to select to send the uplink data packet to the aggregation gateway by using the second tunnel when it is determined that the available bandwidth of the first tunnel is less than the bandwidth required for transmitting the uplink data packet.

Optionally, the home gateway further includes: a decapsulating module 907 configured to receive a downlink GRE packet sent by the aggregation gateway by using the first tunnel and/or the second tunnel, and decapsulate the downlink GRE packet to obtain a downlink data packet and a downlink serial number corresponding to the downlink data packet; and a forwarding module 908 configured to determine whether the downlink serial number is equal to a serial number supposed to be sent at the current moment, where the serial number supposed to be sent at the current moment is a serial number of the last downlink data packet that has already been sent by the aggregation gateway at the current moment plus a constant value, and the constant value is a natural number.

If the downlink serial number is equal to the serial number supposed to be sent at the current moment, the forwarding module 908 sends the downlink data packet corresponding to the downlink serial number.

If the downlink serial number is not equal to the serial number supposed to be sent at the current moment, the forwarding module 908 caches the downlink data packet corresponding to the downlink serial number.

Optionally, the home gateway further includes: a tunnel determining module 909 configured to determine, before the processing module 905 sends the uplink data packet to the aggregation gateway by using the first tunnel and/or the second tunnel, to send the uplink data packet to the aggregation gateway by using the first tunnel and/or the second tunnel according to a routing policy.

Optionally, the home gateway further includes: an information sending module 910 configured to send, after the second tunnel establishing module 904 establishes the second tunnel from the home gateway to the aggregation gateway according to the second address, bandwidth information of the first tunnel and bandwidth information of the second tunnel to the aggregation gateway, so as to enable the aggregation gateway to determine available bandwidth of the first tunnel and available bandwidth of the second tunnel.

A home gateway according to this embodiment may be configured to perform the technical solutions described in the foregoing method embodiments. Implementation principles and technical effects are similar. Details are not described herein again.

Figure 11:
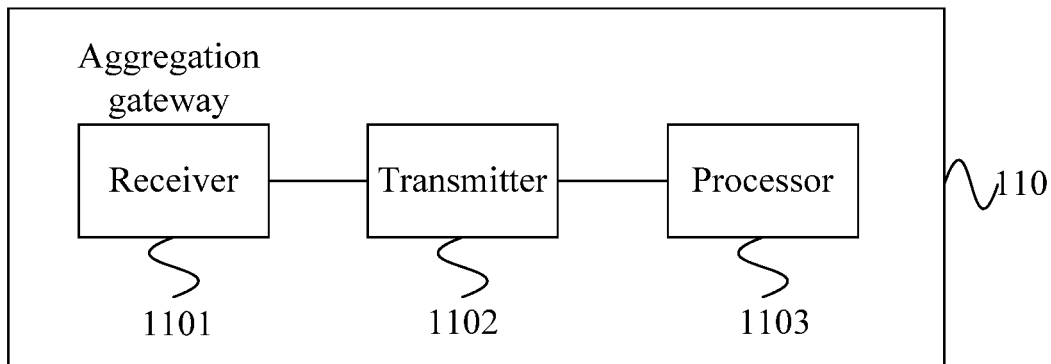
FIG. 11 is a schematic structural diagram of a third embodiment of an aggregation gateway according to the present application.

FIG. 11 is a schematic structural diagram of a third embodiment of an aggregation gateway according to the present application. As shown in FIG. 11, an aggregation gateway 110 according to this embodiment of the present application includes a receiver 1101, a transmitter 1102, and a processor 1103.

The receiver 1101 is configured to receive a first tunnel establishment request message sent by a home gateway, where the first tunnel establishment request message is used to request for establishing a first tunnel.

The transmitter 1102 is configured to send a first tunnel establishment success message to the home gateway. The first tunnel establishment request message includes an identifier of the home gateway and a first address; a source address of the first tunnel is the first address, and a destination address of the first tunnel is an address of the aggregation gateway. The first address is an address of the home gateway on a first access network, where the address is obtained by the home gateway.

The receiver 1101 is further configured to receive a second tunnel establishment request message sent by the home gateway, where the second tunnel establishment request message is used to request for establishing a second tunnel.

The transmitter 1102 is further configured to send a second tunnel establishment success message to the home gateway. The second tunnel establishment request message includes the identifier of the home gateway and a second address; a source address of the second tunnel is the second address, and a destination address of the second tunnel is the address of the aggregation gateway. The second address is an address of the home gateway on a second access network, where the address is obtained by the home gateway.

The processor 1103 is configured to associates the first tunnel with the second tunnel according to the identifier of the home gateway.

The transmitter 1102 is further configured to send a downlink data packet to the home gateway by using the first tunnel and/or the second tunnel.

Optionally, the processor 1103 is further configured to perform Generic Routing Encapsulation GRE for the downlink data packet to obtain a downlink GRE packet, where the downlink GRE packet includes a downlink serial number, and the downlink serial number is used to indicate a sequence in which the aggregation gateway sends the downlink GRE packet.

The transmitter 1102 is further configured to send the downlink GRE packet to the home gateway by using the first tunnel and/or the second tunnel.

Optionally, the processor 1103 is further configured to, before sending the downlink data packet to the home gateway by using the first tunnel and/or the second tunnel, determine whether available bandwidth of the first tunnel is less than bandwidth required for transmitting the downlink data packet; and to select to send the downlink data packet to the home gateway by using the second tunnel when it is determined that the available bandwidth of the first tunnel is less than the bandwidth required for transmitting the downlink data packet, where available bandwidth of the second tunnel is not less than the bandwidth required for transmitting the downlink data packet.

Optionally, the processor 1103 is further configured to receive an uplink GRE packet sent by the home gateway by using the first tunnel and/or the second tunnel, and decapsulate the uplink GRE packet to obtain an uplink data packet and an uplink serial number corresponding to the uplink data packet.

The processor 1103 is further configured to determine whether the uplink serial number is equal to a serial number supposed to be sent at the current moment, where the serial number supposed to be sent at the current moment is a serial number of the last uplink data packet that has already been sent by the aggregation gateway at the current moment plus a constant value, and the constant value is a natural number.

If the uplink serial number is equal to the serial number supposed to be sent at the current moment, the processor 1103 sends the uplink data packet corresponding to the uplink serial number.

If the uplink serial number is not equal to the serial number supposed to be sent at the current moment, the processor 1103 caches the uplink data packet corresponding to the uplink serial number.

Optionally, the processor 1103 is further configured to receive, before sending the downlink data packet to the home gateway by using the first tunnel and/or the second tunnel, bandwidth information of the first tunnel and bandwidth information of the second tunnel, and determine the available bandwidth of the first tunnel and available bandwidth of the second tunnel.

An aggregation gateway according to this embodiment may be configured to perform the technical solutions described in the foregoing method embodiments. Implementation principles and technical effects are similar. Details are not described herein again.

Figure 12:
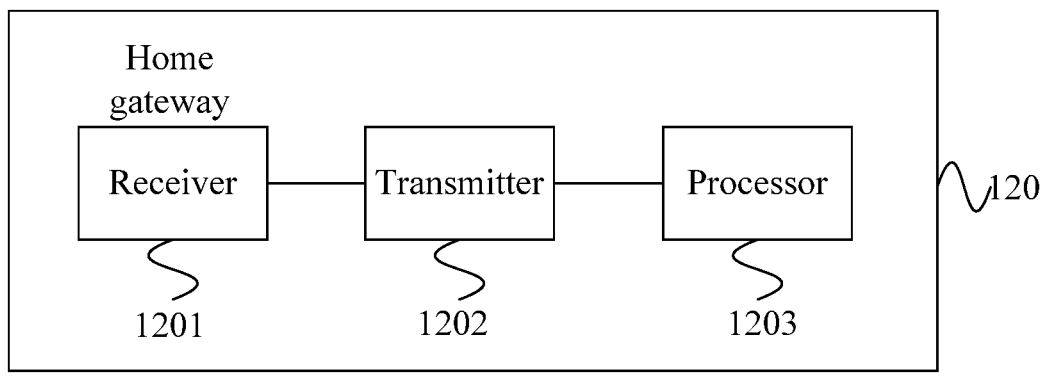
FIG. 12 is a schematic structural diagram of a third embodiment of a home gateway according to the present application.

FIG. 12 is a schematic structural diagram of a third embodiment of a home gateway according to the present application. As shown in FIG. 12, a home gateway 120 according to this embodiment of the present application includes a receiver 1201, a transmitter 1202, and a processor 1203.

The receiver 1201 is configured to obtain a first address of the home gateway on a first access network.

The processor 1203 is configured to establish a first tunnel from the home gateway to an aggregation gateway according to the first address, where a source address of the first tunnel is the first address, and a destination address of the first tunnel is an address of the aggregation gateway.

The receiver 1201 is further configured to obtain a second address of the home gateway on a second access network.

The processor 1203 is further configured to establish a second tunnel from the home gateway to the aggregation gateway according to the second address, where a source address of the second tunnel is the second address, and a destination address of the second tunnel is the address of the aggregation gateway.

The processor 1203 is further configured to receive an uplink data packet sent by a user equipment, and send the uplink data packet to the aggregation gateway by using the first tunnel and/or the second tunnel.

Optionally, the transmitter 1202 is configured to send a first tunnel establishment request message to the aggregation gateway by using the first access network, where the first tunnel establishment request message is used to request for establishing the first tunnel, and the first tunnel establishment request message includes an identifier of the home gateway and the first address.

The receiver 1201 is further configured to receive a first tunnel establishment success message sent by the aggregation gateway.

The transmitter 1202 is further configured to send a second tunnel establishment request message to the aggregation gateway by using the second access network, where the second tunnel establishment request message is used to request for establishing the second tunnel, and the second tunnel establishment request message includes the identifier of the home gateway and the second address.

The receiver 1201 is further configured to receive a second tunnel establishment success message sent by the aggregation gateway.

The transmitter 1202 is further configured to send an IP address request message to a first gateway corresponding to the first access network.

The receiver 1201 is further configured to receive an IP address response message sent by the first gateway, where the IP address response message includes the first address of the home gateway on the first access network, and the first address is a first IP address.

The transmitter 1202 is further configured to send an IP address request message to a second gateway corresponding to the second access network.

The receiver 1201 is further configured to receive an IP address response message sent by the second gateway, where the IP address response message includes the second address of the home gateway on the second access network, and the second address is a second IP address.

The processor 1203 is further configured to receive the uplink data packet sent by the user equipment, and perform Generic Route Encapsulation GRE for the uplink data packet to obtain an uplink GRE packet, where the uplink GRE packet includes an uplink serial number, and the uplink serial number is used to indicate a sequence in which the home gate sends the uplink GRE packet;

The processor 1203 is further configured to send the uplink GRE packet to the aggregation gateway by using the first tunnel and/or the second tunnel.

Optionally, the processor 1203 is further configured to, before sending the uplink data packet to the aggregation gateway by using the first tunnel and/or the second tunnel, determine whether available bandwidth of the first tunnel is less than bandwidth required for transmitting the uplink data packet; to select to send the uplink data packet to the aggregation gateway by using the first tunnel when it is determined that the available bandwidth of the first tunnel is not less than the bandwidth required for transmitting the uplink data packet; and to select to send the uplink data packet to the aggregation gateway by using the second tunnel when it is determined that the available bandwidth of the first tunnel is less than the bandwidth required for transmitting the uplink data packet.

Optionally, the processor 1203 is further configured to receive a downlink GRE packet sent by the aggregation gateway by using the first tunnel and/or the second tunnel, and decapsulate the downlink GRE packet to obtain a downlink data packet and a downlink serial number corresponding to the downlink data packet.

The processor 1203 is further configured to determine whether the downlink serial number is equal to a serial number supposed to be sent at the current moment, where the serial number supposed to be sent at the current moment is a serial number of the last downlink data packet that has already been sent by the home gateway at the current moment plus a constant value, and the constant value is a natural number.

If the downlink serial number is equal to the serial number supposed to be sent at the current moment, the processor 1203 sends the downlink data packet corresponding to the downlink serial number.

If the downlink serial number is not equal to the serial number supposed to be sent at the current moment, the processor 1203 caches the downlink data packet corresponding to the downlink serial number.

Optionally, the processor 1203 is further configured to determine, before sending the uplink data packet to the aggregation gateway by using the first tunnel and/or the second tunnel, to send the uplink data packet to the aggregation gateway by using the first tunnel and/or the second tunnel according to a routing policy.

Optionally, the transmitter 1202 is further configured to send, after establishing the second tunnel from the home gateway to the aggregation gateway according to the second address, bandwidth information of the first tunnel and bandwidth information of the second tunnel to the aggregation gateway, so as to enable the aggregation gateway to determine the available bandwidth of the first tunnel and available bandwidth of the second tunnel.

A home gateway according to this embodiment may be configured to perform the technical solutions described in the foregoing method embodiments. Implementation principles and technical effects are similar. Details are not described herein again.

In the several embodiments provided in the present application, it should be understood that the disclosed device and method may be implemented in other manners. For example, the described apparatus embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. A part or all of the modules may be selected according to actual needs to achieve the objectives of the solutions of the embodiments.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

Finally, it should be noted that the foregoing embodiments are merely intended for describing the technical solutions of the present application, other than limiting the present application. Although the present application is described in detail with reference to the foregoing embodiments, persons of ordinary skill in the art should understand that they may still make modifications to the technical solutions described in the foregoing embodiments, or make equivalent substitutions to some or all the technical features thereof, without departing from the spirit and scope of the technical solutions of the embodiments of the present application.

What is claimed is:

1. A method comprising:
   sending, by a home gateway and to a first gateway corresponding to a first access network, a first Internet Protocol (IP) address request message;
   receiving, by the home gateway and from the first gateway, a first IP address response message comprising a first address of the home gateway on the first access network;
   sending, by the home gateway and to a second gateway corresponding to a second access network, a second IP address request message;
   receiving, by the home gateway and from the second gateway, a second IP address response message comprising a second address of the home gateway on the second access network;
   receiving, by an aggregation gateway and from the home gateway, a first tunnel establishment request message comprising the first address and requesting establishment of a first tunnel between the first address and the second address of the aggregation gateway;
   sending, by the aggregation gateway and to the home gateway in response to the first tunnel establishment request message, a first tunnel establishment success message;
   receiving, by the aggregation gateway and from the home gateway, a second tunnel establishment request message comprising a third address of the home gateway on the second access network and requesting establishment of a second tunnel between the second address and the third address;
   sending, by the aggregation gateway and to the home gateway in response to the second tunnel establishment request message, a second tunnel establishment success message; and
   associating the first tunnel with the second tunnel to transmit traffic from the home gateway to a network through at least one of the first tunnel or the second tunnel,
   wherein a sum of a first preset bandwidth of the first tunnel and a second preset bandwidth of the second tunnel is a maximum available bandwidth.

2. The method of claim 1, where the first tunnel corresponds to the first access network and the second tunnel corresponds to the second access network, and wherein a first type of the first access network is different from a second type of the second access network.

3. The method of claim 2, wherein the first access network is a mobile carrier network and the second access network is a fixed network.

4. The method of claim 1, wherein the first tunnel establishment request message further comprises an identifier of the home gateway.

5. The method of claim 4, wherein the identifier comprises at least one of an Internet Protocol (IP) address of the home gateway, a media access control (MAC) address of the home gateway, or a user name.

6. The method of claim 1, further comprising associating the first tunnel with the second tunnel according to an identifier of the home gateway.

7. The method of claim 1, further comprising storing an association between the first tunnel and the second tunnel.

8. The method of claim 1, wherein the first tunnel is a work tunnel and the second tunnel is a standby tunnel.

9. A method comprising:
   sending, by a home gateway and to a first gateway corresponding to a first access network, a first Internet Protocol (IP) address request message;
   receiving, by the home gateway and from the first gateway, a first IP address response message comprising a first address of the home gateway on the first access network;
   sending, by the home gateway and to a second gateway corresponding to a second access network, a second IP address request message;

receiving, by the home gateway and from the second gateway, a second IP address response message comprising a second address of the home gateway on the second access network;

receiving, by an aggregation gateway, first traffic directed to the home gateway; and transmitting, by the aggregation gateway, the first traffic to the home gateway through one of a first tunnel, a second tunnel, or both the first tunnel and the second tunnel, wherein the first tunnel is between the aggregation gateway and the first address, wherein the second tunnel is between the aggregation gateway and the second address, wherein the first tunnel and the second tunnel are associated with each other based on an identifier of the home gateway, and wherein a sum of a first preset bandwidth of the first tunnel and a second preset bandwidth of the second tunnel is a maximum available bandwidth.

10. The method of claim 9, wherein the first tunnel is a Generic Routing Encapsulation (GRE) tunnel.

11. The method of claim 9, further comprising transmitting, by the aggregation gateway, the first traffic to the home gateway through either the second tunnel or both the first tunnel and the second tunnel when an available bandwidth of the first tunnel is less than a bandwidth required for transmitting the first traffic and when available bandwidth of the second tunnel is greater than or equal to the bandwidth required for transmitting the first traffic.

12. The method of claim 9, further comprising transmitting, by the aggregation gateway, the first traffic to the home gateway through either the first tunnel or both the first tunnel and the second tunnel when an available bandwidth of the first tunnel is greater than or equal to a bandwidth required for transmitting the first traffic and when an available bandwidth of the second tunnel is greater than or equal to the bandwidth required for transmitting the first traffic.

13. The method of claim 9, wherein a preset bandwidth of the first tunnel is a bandwidth of a physical line.

14. The method of claim 9, further comprising:
receiving, by the aggregation gateway, second traffic from the home gateway through one of the first tunnel, the second tunnel, or both the first tunnel and the second tunnel; and
transmitting, by the aggregation gateway, the second traffic.

15. The method of claim 14, wherein before transmitting the second traffic, the method further comprises:
obtaining, by the aggregation gateway, first bandwidth information of the first tunnel and second bandwidth information of the second tunnel; and
determining, by the aggregation gateway, available bandwidth of the first tunnel according to the first bandwidth information and available bandwidth of the second tunnel according to the second bandwidth information.

16. A method implemented by a home gateway, the method comprising:
obtaining a first address of the home gateway on a first access network by:
sending, to a first gateway corresponding to the first access network, a first Internet Protocol (IP) address request message, and
receiving, from the first gateway, a first IP address response message comprising the first address;
establishing a first tunnel between the first address and an aggregation gateway; obtaining a second address of the home gateway on a second access network by:
sending, to a second gateway corresponding to the second access network, a second IP address request message, and
receiving, from the second gateway, a second IP address response message comprising the second address;
establishing a second tunnel between the second address and the aggregation gateway;
receiving first traffic from a user equipment; and
sending the first traffic to the aggregation gateway through one of the first tunnel, the second tunnel, or both the first tunnel and the second tunnel,
wherein the first tunnel and the second tunnel are associated with each other based on an identifier of the home gateway, and
wherein a sum of a first preset bandwidth of the first tunnel and a second preset bandwidth of the second tunnel is a maximum available bandwidth.

17. The method of claim 16, wherein establishing the first tunnel comprises:
sending, to the aggregation gateway using the first access network, a first tunnel establishment request message comprising the first address and requesting establishment of the first tunnel; and
receiving, from the aggregation gateway in response to the first tunnel establishment request message, a first tunnel establishment success.

18. The method of claim 16, where the first tunnel is a Generic Routing Encapsulation (GRE) tunnel.

19. The method of claim 16, further comprising sending the first traffic to the aggregation gateway through the first tunnel when an available bandwidth of the first tunnel is greater than or equal to a bandwidth required for transmitting the first traffic.

20. The method of claim 16, further comprising sending bandwidth information of the first tunnel and bandwidth information of the second tunnel to the aggregation gateway.

21. The method of claim 16, further comprising sending the first traffic to the aggregation gateway through either the second tunnel or both the first tunnel and the second tunnel when an available bandwidth of the first tunnel is less than a bandwidth required for transmitting the first traffic and when an available bandwidth of the second tunnel is greater than or equal to the bandwidth required for transmitting the first traffic.

22. A home gateway comprising:
a memory comprising instructions; and
a processor coupled to the memory and configured to execute the instructions, which causes the processor to be configured to:
obtain a first address of the home gateway on a first access network by:
sending, to a first gateway corresponding to the first access network, a first Internet Protocol (IP) address request message, and
receiving, from the first gateway, a first IP address response message comprising the first address;
establish a first tunnel between the first address and an aggregation gateway;
obtain a second address of the home gateway on a second access network by:
sending, to a second gateway corresponding to the second access network, a second IP address request message, and receiving, from the second gateway, a second IP address response message comprising the second address;
establish a second tunnel between the second address and the aggregation gateway;
receive first traffic from a user equipment; and
send the first traffic to the aggregation gateway through one of the first tunnel, the second tunnel, or both the first tunnel and the second tunnel,
wherein the first tunnel and the second tunnel are associated with each other based on an identifier of the home gateway, and
wherein a sum of a first preset bandwidth of the first tunnel and a second preset bandwidth of the second tunnel is a maximum available bandwidth.

23. A system comprising:
an aggregation gateway; and
a home gateway configured to:
obtain a first address of the home gateway on a first access network by:
sending, to a first gateway corresponding to the first access network, a first Internet Protocol (IP) address request message, and
receiving, from the first gateway, a first IP address response message comprising the first address;
establish a first tunnel between the first address and the aggregation gateway; obtain a second address of the home gateway on a second access network by:
sending, to a second gateway corresponding to the second access network, a second IP address request message, and
receiving, from the second gateway, a second IP address response message comprising the second address;
establish a second tunnel between the second address and the aggregation gateway;
receive first traffic from a user equipment; and
send the first traffic to the aggregation gateway through one of the first tunnel, the second tunnel, or both the first tunnel and the second tunnel,
wherein the first tunnel and the second tunnel are associated with each other based on an identifier of the home gateway, and
wherein a sum of a first preset bandwidth of the first tunnel and a second preset bandwidth of the second tunnel is a maximum available bandwidth.

24. A system comprising:
a home gateway comprising a first address on a first access network, comprising a second address on a second access network, and configured to:
send to a first gateway corresponding to the first access network, a first Internet Protocol (IP) address request message,
receive, from the first gateway, a first IP address response message comprising the first address,
send, to a second gateway corresponding to the second access network, a second IP address request message, and
receive, from the second gateway, a second IP address response message comprising the second address; and
an aggregation gateway comprising a third address and configured to:
receive, from the home gateway, a first tunnel establishment request message comprising the first address and requesting establishment of a first tunnel between the first address and the third address;
send, to the home gateway in response to the first tunnel establishment request message, a first tunnel establishment success message;
receive, from the home gateway, a second tunnel establishment request message comprising the second address and requesting establishment of a second tunnel between the second address and the third address;
send, to the home gateway in response to the second tunnel establishment request message, a second tunnel establishment success message; and
associate the first tunnel with the second tunnel to transmit traffic from the home gateway to a network through at least one of the first tunnel or the second tunnel,
wherein a sum of a first preset bandwidth of the first tunnel and a second preset bandwidth of the second tunnel is a maximum available bandwidth.

25. A system comprising:
a home gateway comprising a first address on a first access network, comprising a second address on a second access network, and configured to:
send to a first gateway corresponding to the first access network, a first Internet Protocol (IP) address request message,
receive, from the first gateway, a first IP address response message comprising the first address,
send, to a second gateway corresponding to the second access network, a second IP address request message, and
receive, from the second gateway, a second IP address response message comprising the second address; and
an aggregation gateway configured to:
receive first traffic directed to the home gateway; and
transmit the first traffic to the home gateway through one of a first tunnel, a second tunnel, or both the first tunnel and the second tunnel,
wherein the first tunnel is between the aggregation gateway and the first address,
wherein the second tunnel is between the aggregation gateway and the second address,
wherein the first tunnel and the second tunnel are associated with each other based on an identifier of the home gateway, and
wherein a sum of a first preset bandwidth of the first tunnel and a second preset bandwidth of the second tunnel is a maximum available bandwidth.

* * * * *